United States Patent [19]

Feinbloom

[11] Patent Number: 5,769,523
[45] Date of Patent: Jun. 23, 1998

[54] SURGICAL HEADLAMP WITH DUAL APERTURE CONTROL

[75] Inventor: Richard E. Feinbloom, New York, N.Y.

[73] Assignee: Designs for Vision, Inc., Ronkonkoma, N.Y.

[21] Appl. No.: 650,218

[22] Filed: May 21, 1996

Related U.S. Application Data

[63] Continuation of Ser. No. 281,915, Jul. 28, 1994, abandoned.

[51] Int. Cl.⁶ ........................................................ F21V 8/00
[52] U.S. Cl. .......................... 362/32; 362/105; 362/106; 362/268; 362/804; 362/281
[58] Field of Search .................................... 362/282, 321, 362/32, 804, 268, 105, 106, 281; 359/894; 385/901, 33, 89; 600/249

[56] References Cited

U.S. PATENT DOCUMENTS

| | | |
|---|---|---|
| 1,784,425 | 12/1930 | George . |
| 2,142,297 | 1/1939 | Albersheim . |
| 2,672,799 | 3/1954 | Terwilliger . |
| 3,194,230 | 7/1965 | Springer .............................. 362/804 X |
| 3,307,028 | 2/1967 | Bentham ................................ 362/281 |
| 3,830,230 | 8/1974 | Chester ................................... 362/105 |
| 3,849,649 | 11/1974 | Carey . |
| 3,902,792 | 9/1975 | Plummer . |
| 4,104,709 | 8/1978 | Kloots ................................ 362/804 X |
| 4,288,164 | 9/1981 | Toth ....................................... 356/445 |
| 4,482,218 | 11/1984 | Tanaka ................................... 350/427 |
| 4,516,190 | 5/1985 | Kloots ............................... 362/804 X |
| 4,616,257 | 10/1986 | Kloots et al. ...................... 362/804 X |
| 4,893,225 | 1/1990 | Solomon ................................ 362/281 |
| 4,904,055 | 2/1990 | Bridges ................................... 350/272 |
| 5,229,877 | 7/1993 | Hanada ................................... 359/236 |
| 5,303,125 | 4/1994 | Miller ...................................... 362/32 |
| 5,355,285 | 10/1994 | Hicks ................................ 362/804 X |

Primary Examiner—Thomas M. Sember
Attorney, Agent, or Firm—Plevy & Associates

[57] ABSTRACT

An apparatus and associated method for projecting a light pattern onto a target object, wherein the light pattern has a generally uniform brightness with well defined boarders. The apparatus includes a fiber optic conduit that emits a beam of light along an optical path. Light emitted from a fiber optic conduit typically contains a central region of a predetermined brightness and a peripheral region, created by light interference patterns, where the light is less bright. A first adjustable optical diaphragm is disposed along the optical path proximate the fiber optic conduit. By selectively varying to aperture of the first optical diaphragm, the diameter of the beam of light propagated along the optical path can be controlled. A second adjustable optical diaphragm is disposed along the optical path a predetermined distance away from the first optical diaphragm. By selectively varying the aperture of the second optical diaphragm, the second optical diaphragm can be adjusted to selectively obstruct the peripheral region of the beam of light. Accordingly, only the central region of the beam of light propagates along the optical path unobstructed, resulting in a uniform and well defined beam of light.

8 Claims, 4 Drawing Sheets

SURGICAL HEADLAMP WITH DUAL APERTURE CONTROL

This is a continuation of application Ser. No. 08/281,915, filed on Jul. 28, 1994, entitled SURGICAL HEADLAMP WITH DUAL APERTURE CONTROL.

BACKGROUND OF THE INVENTION

I. Field of the Invention

The present invention relates in general to illumination devices having a dual aperture control for controlling the size of a projected beam of light. More specifically, the present invention relates to a surgical headlamp with a dual aperture control that controls the size of a projected beam of light, and does so in a manner that produces a clear and well defined area of illumination.

II. Prior Art Statement

When a surgeon operates on a patient, it is very important that the surgeon clearly see the area of the patient's body being operated upon. During many types of operations, ambient light is insufficient for the surgeon's needs because such light is often undirected and the presence of the surgeon and other medical personnel around the patient casts shadows across the patient. Consequently, many surgeons wear headlamps during an operation. Headlamps are worn on the head of the surgeon and shine an intense beam of light down onto the patient. Since the headlamp is held on the surgeon's head, the surgeon only needs to move his/her head to adjust the position of the beam of light and change the area of the patient's body that is being illuminated. An example of a typical surgeon's headlamp is shown in U.S. Pat. No. DES. 238,958 entitled SURGICAL HEADLIGHT and assigned to Designs for Visions Inc., the assignee herein.

Although some surgical headlamps are electrically operated and contain incandescent bulbs, and most modern surgical headlamps are designed to accept a fiber optic conduit. The fiber optic conduits are connected to remote light sources, wherein the fiber optic conduits transfer the light generated by the light source to the surgical headlamp. The advantage of utilizing a surgical headlamp with a remote light source and fiber optic conduit, is that the surgical headlamp can project a very intense beam of light from a small, lightweight headlamp structure. Additionally, the intensity of the projected light can be adjusted at the remote light source, thus the surgeon need not touch the headlamp structure upon his/her head.

Although, headlamps that use fiber optic conduits are generally considered superior to incandescent bulb headlamps, they still have some disadvantages. As light passes through a fiber optic element, the light is repeatedly reflected off of the interior surface of the fiber optic element as the light travels the length of the fiber optic element. As a result, when the light finally reaches the end of the fiber optic element, the light exits the fiber optic element at an angle incident to the angle of the lights last reflection within the element. Consequently, the light exiting multiple fiber optic elements in a fiber optic conduit are not collimated, but rather randomly diverge and converge within the projected beam. This creates interference within the projected beam that adversely effects the uniformity of the beam. Additionally, as light exits the fiber optic conduit and is projected onto a target object, the light reflects from the target object back toward the fiber optic conduit. The reflected light causes additional interferences within the projected light beam which also adversely effects the uniformity of the projected light.

Referring to FIG. 1 there is shown a projected light pattern 10 from a prior art headlamp device that uses a fiber optic conduit. As can be seen, the projected light pattern includes a central region 12 of diameter D where the light is of a generally uniform intensity. Surrounding the central region 12 is a secondary interference region 14 that is not of a uniform intensity and is much less intense than the central region 12, creating a penumbra. The interference region 14 is caused by interference patterns in the projected light created by reflected light and the random exit angle of light emanating from the multiple fiber optic elements. The light from the interference region 14 is not bright enough or uniform enough to be used by a surgeon. Consequently, in order for a surgeon to cause the central region 12 of the projected light to cover a desired area of the patient, the interference region 14 of light will inevitably extend into surrounding areas. During an operation, many metal instruments are used, such as retractors, clamps, suction heads and the like. These instruments are typically made of stainless steel and are highly reflective. As a surgeon performs an operation, he/she can adjust the size of the central region 12 of the projected light as desired. However, the interference region 14 extends beyond the desired region of illumination and often reflects off of the surrounding surgical instruments. This is highly distractive to the surgeon who is repeatedly blinded by the gleam of the light reflected off of the surgical instruments.

The present invention eliminates the interference region of a projected light pattern by using a double aperture design. The use of two apertures to adjust the size of a projected beam is a technology that has been applied to many different fields of endeavor. Examples of such are shown in U.S. Pat. No. 3,849,649 to Caney, entitled VARIABLE APERTURE X-RAY SHIELD; U.S. Pat. No. 3,902,792 to Plummer entitled LANDSCAPE LENS; and U.S. Pat. No. 2,142,297 to Albersheim, entitled OPTICAL SYSTEM. However, none of these patents address the specific problem of removing the distortion that inevitably occurs when light is projected from a fiber optic conduit. Similarly, the cited prior art references do not show double aperture designs within a headlamp assembly or any other similar light projecting device.

Another problem common to prior art headlamp devices is the appearance of black spots in the projected light image. As a fiber optic conduit is used, some of the fiber optic elements in the conduit may break. If the headlamp has optical elements that are focused directly upon the fiber optic conduit, any broken fiber optic element would appear as a dark spot in the projected image. Similarly, if ultra fine fiber optic elements are not used, the projected light image may have a honeycomb appearance, wherein the points corresponding to the center of a fiber optic element would appear brighter than a point corresponding to the edge surfaces between fiber optic elements. The occurrence of black spots and/or a illuminated region with bright and dark regions is highly distractive to the surgeon, who is depending upon the headlamp to clearly and evenly illuminate the area of the operation.

It is therefore the object of the present invention to provide a headlamp assembly wherein the size of the beam of projected light can be adjusted as desired and the region of interference commonly associated with light projected through a fiber optic conduit can be eliminated.

It is a further object of the present invention to provide a headlamp assembly that receives light through a fiber optic conduit yet provides uniform illumination and does not produce black spots should any element in the fiber optic conduit be broken.

SUMMARY OF THE INVENTION

The present invention is an apparatus and associated method for projecting a light pattern onto a target object, wherein the light pattern has a generally uniform brightness with well defined boarders. The apparatus includes a fiber optic conduit that emits a beam of light along an optical path. Light emitted from a fiber optic conduit typically contains a central region of a predetermined brightness and a peripheral region, created by light interference patterns, where the light is less bright. A first adjustable optical diaphragm is disposed along the optical path proximate the fiber optic conduit. By selectively varying to aperture of the first optical diaphragm, the diameter of the beam of light propagated along the optical path can be controlled. A second adjustable optical diaphragm is disposed along the optical path a predetermined distance away from the first optical diaphragm. By selectively varying the aperture of the second optical diaphragm, the second optical diaphragm can be adjusted to selectively obstruct the peripheral region of the beam of light. Accordingly, only the central region of the beam of light propagates along the optical path unobstructed, resulting in a uniform and well defined beam of light.

BRIEF DESCRIPTION OF THE DRAWINGS

For a better understanding of the present invention, reference is made to the following descriptions of two exemplary embodiments thereof, considered in conjunction with the accompanying drawings, in which.

DETAILED DESCRIPTION OF THE INVENTION

Although the present invention can be used in many different applications where light is projected from a fiber optic conduit for the purposes of illumination, the present invention is especially suitable for use in connection with surgical headlamps. Accordingly, the present invention will be described herein as part of a surgical illumination assembly.

Figure 2:
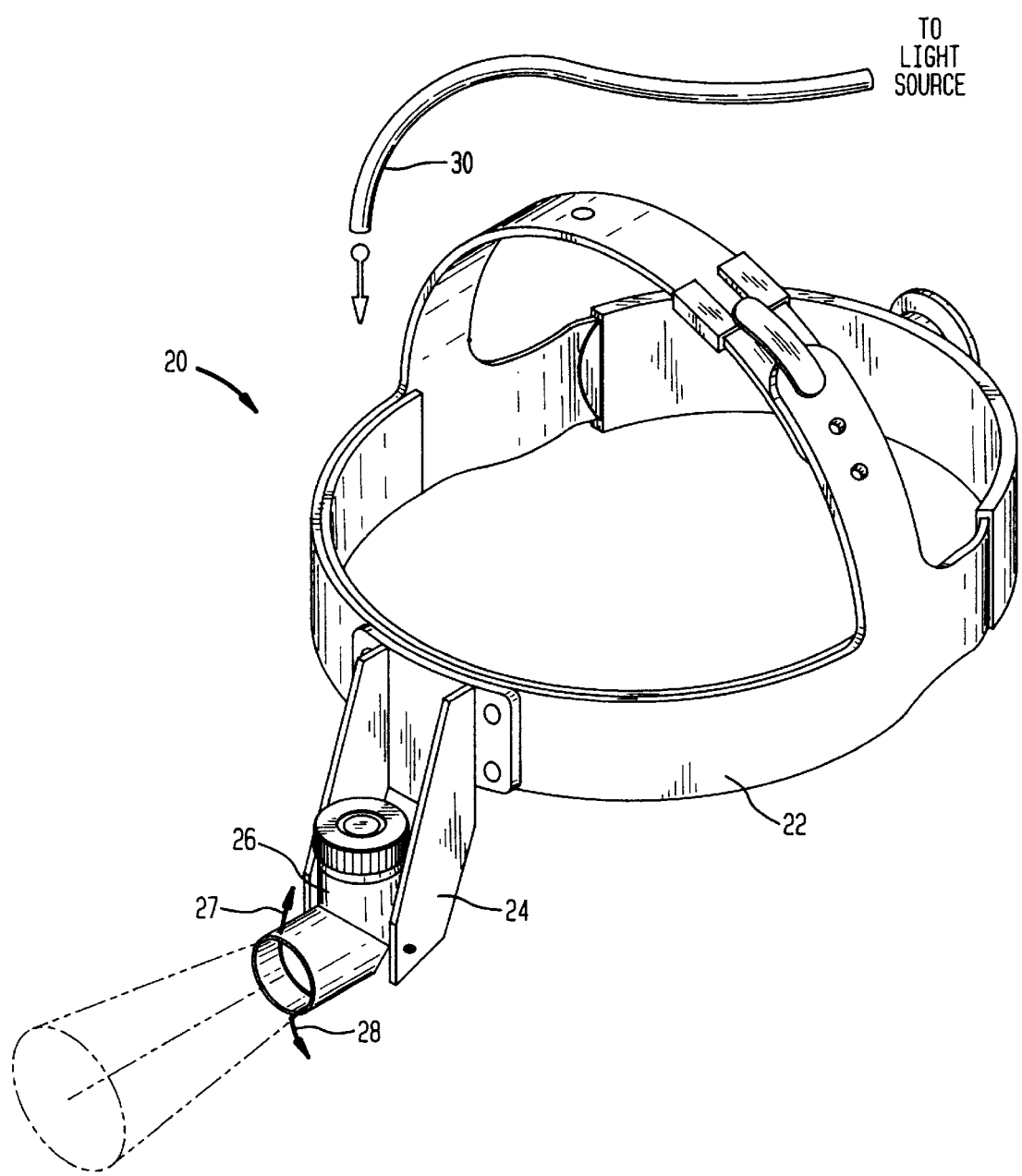
FIG. 2 is a perspective view of one preferred embodiment of the present invention surgical headlamp device, shown in conjunction with support strapping used to hold the headlamp device on a person's head.

Referring to FIG. 2 there is shown a surgical illumination assembly 20 for use by a surgeon or other medical professional. The surgical illumination assembly 20 includes an adjustable strap arrangement 22 that is positionable upon a surgeon's head. A support bracket 24 extends downwardly from the front of the adjustable strap arrangement 22 and supports a headlamp assembly 26 over what would be the forehead of the surgeon. The headlamp assembly 26 is pivotally coupled to the support bracket 24, thereby enabling the headlamp assembly 26 to be pivotally adjusted either upwardly or downwardly as desired in the directions of arrows 27, 28.

A fiber optic conduit 30 passes into the headlamp assembly 26. The fiber optic conduit 30 is coupled at its distal end to a light source which transmits light through the fiber optic conduit 30. Light sources that transmit light through fiber optic conduits for the purposes of illumination are well known in the art and are commonly used in conjunction with surgeon's headlamps. As such, the composition of a light source capable of transmitting light through the fiber optic conduit 30 need not be described herein.

Figure 3:
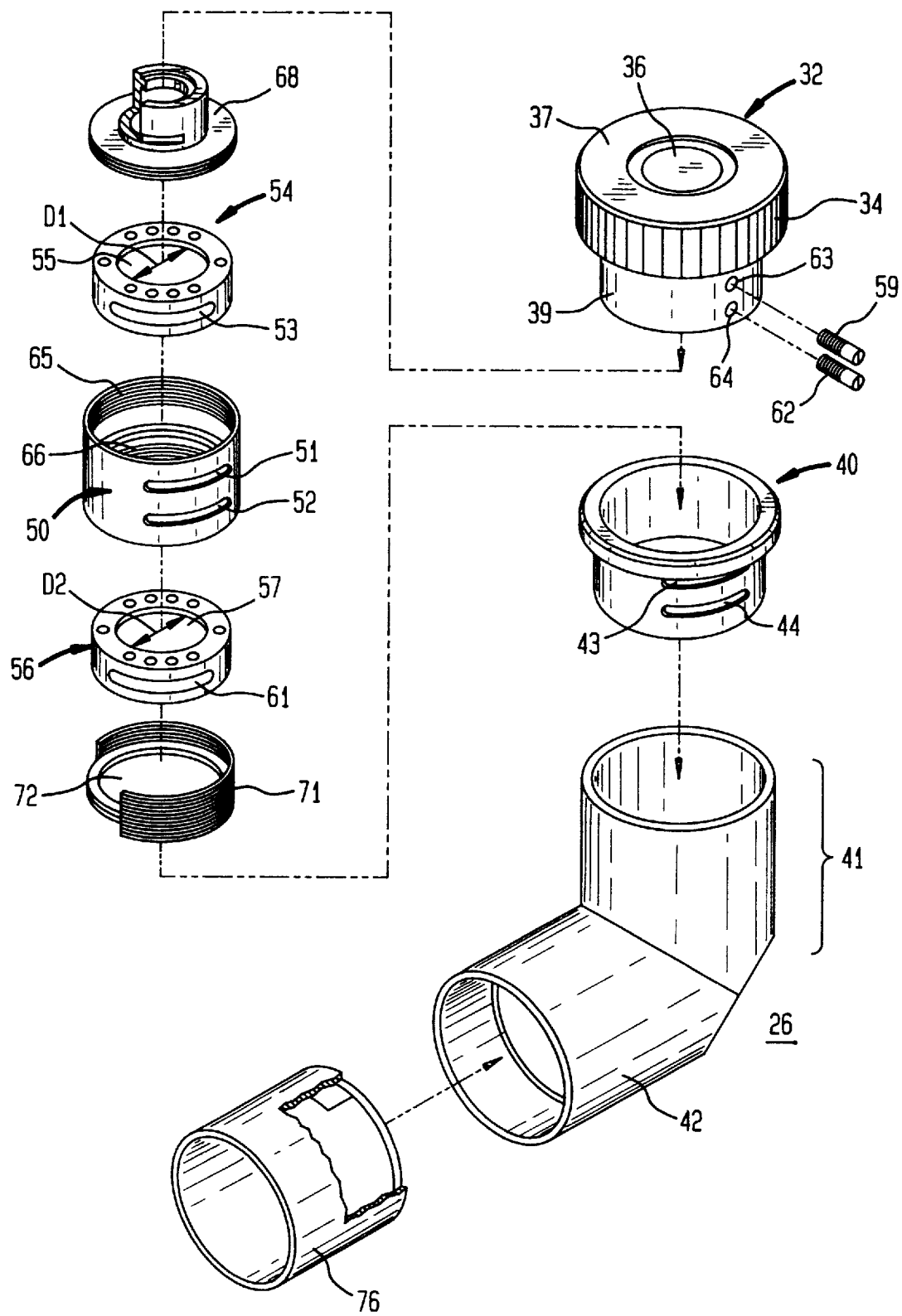
FIG. 3 is an exploded view of the present invention surgical headlamp device.
Figure 4:
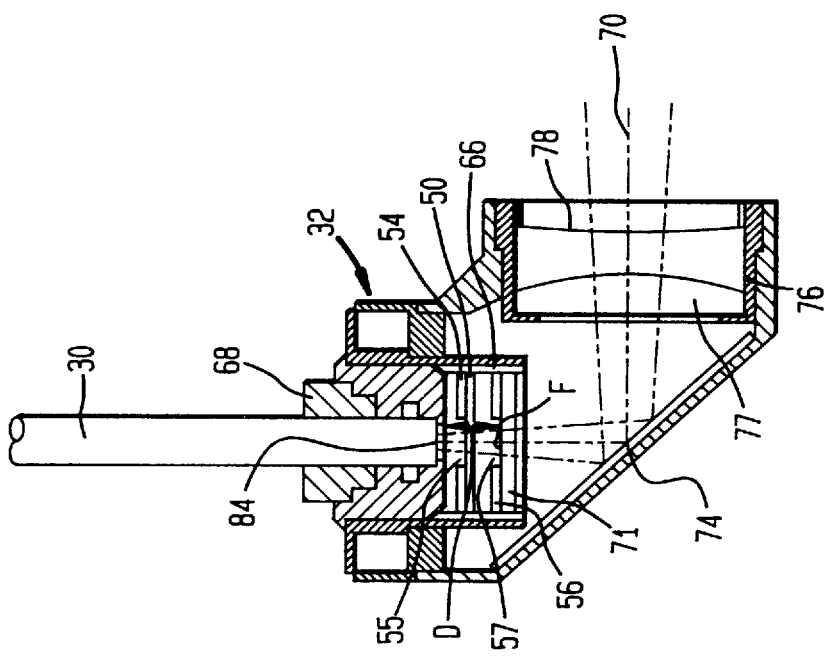
FIG. 4 is a cross-sectional view of the headlamp device shown in FIG. 2, viewed along section line 4—4.

Referring to FIG. 3 and 4 it can be seen that a knurled adjustment collar 32 is disposed at the upper end of headlamp assembly 26. The adjustment collar 32 has a knurled exterior surface 34 to provide ease in manually turning the adjustment collar 32 for a purpose which will be later explained. An aperture 36 is disposed on the top surface 37 of the adjustment collar 32, through which the fiber optic conduit 30 (FIG. 2) passes. The lower section 39 of the adjustment collar 32 fits within a collet housing 40, which in turn fits into the vertical portion 41 of the primary housing 42. Two slots 43, 44 are disposed in the collet housing 40, the purpose of which will be later described.

An iris housing 50 is disposed within the collet housing 40. The iris housing 50 also includes two slots 51, 52 that align with the slots 43, 44 in the collet housing 40 when the iris housing 50 is assembled into the collet housing 40. A first iris diaphragm 54 and a second diaphragm 56 are positioned within this iris housing 50. The first iris diaphragm 54 is adjustable and defines an aperture 55 of diameter D1 which can be varied through a predetermined range. A slot 53 is formed on the side of the iris diaphragm 54. The slot 53 on the first iris diaphragm 54, when assembled in the iris housing 50, aligns with the slot 51 in the iris housing 50. The diameter D1 of the aperture 55 defined by the iris diaphragm 54 is controlled by the movement of adjustment pin 59 within the slot 53. Iris diaphragms that are adjustable via the movement of an adjustment pin in a slot is well known in the prior art and needed not be described herein.

The second iris diaphragm 56 is also adjustable, wherein the second iris diaphragm 56 defines an aperture 57 of diameter D2 which can be varied through a predetermined range. A slot 61 is formed on the side of the iris diaphragm 56. The diameter D2 of the aperture 57 defined by the iris diaphragm 56 is controlled by the movement of an adjustment pin 62 within the slot 61.

Optical diaphragms having selectively adjustable apertures are commercially available and are widely used in various optical arrangements in the prior art. Any such commercially available diaphragm can be used as both the first and second diaphragm 54, 56 of the present embodiment.

The adjustment pin 59 that adjusts the diameter D1 of the aperture 55 in the first diaphragm 54 extends into a first small hole 63 in the lower section 39 of the adjustment collar 32. Similarly, the adjustment pin 62 that adjusts the diameter D2 of the aperture 57 in the second iris diaphragm 56 extends into a second small hole 64 in the lower section 39 of the adjustment collar 32. The adjustment collar 39 passes into the collet housing 40 but is not anchored to the collet housing 40. As a result, the adjustment collar 32 is free to rotate within the collet housing 40. The adjustment pins 59, 62 couple to the first and second iris diaphragm 54, 56 respectfully. The adjustment pins 59, 62 extend from the first and second iris diaphragms 54, 56 through the slots 51, 52 in the iris housing 50 and the slots 43, 44 in the collet housing 40. Accordingly, as the adjustment collar 32 is rotated, the adjustment pins 59, 62 are moved in relation to the collet housing 40, iris housing 50 and the first and second iris diaphragms 54, 56. The movement of the adjustment pins 59, 62 causes the apertures 55, 57 defined by the first and second iris diaphragm 54, 56 to change size. It will therefore be understood that by turning the adjustment collar 32, both iris diaphragms 54, 56 are simultaneously adjusted.

In the shown embodiment, the first iris diaphragm 54 defines an aperture 55 of a diameter D1. The second iris diaphragm 56 defines an aperture 57 of a diameter D2. The importance of the proportional relationship between first aperture 55 and second aperture 57 will be later described.

The iris housing 50 has an upper interior threaded region 65 and a lower interior threaded region 66. A cable connector 68 threads into the upper interior threaded region 65. The cable connector 68 is shaped to receive the fiber optic conduit 30 (FIG. 4) after the fiber optic conduit passes through the aperture 36 on the top surface 37 of the adjustment collar 32. The cable connector 68 receives and retains the output end 84 of the fiber optic conduit 30, thereby holding the fiber optic conduit 30 into a set position that enables the light emanating from the fiber optic conduit 30 to be directed along a predetermined optical path 70 (FIG. 4).

A first lens housing 71 threads into the lower interior threaded region 66 of the iris housing 50. The lens housing 71 retains a bi-convex lens 72 (FIG. 3) used in focusing the light progating along the optical path 70. Light passing through the bi-convex lens 72 is reflected 90° off of a mirror 74 (FIG. 4), whereby the light is directed into the objective lens housing 76. The objective lens housing 76 contains one plano-convex lenses 77, and one plano cover lens 78. The lens 77 (FIG. 4) focuses the light traveling along the optical path 70 and projects that light forward onto a target object.

As illustrated in FIG. 4 the lenses 77, 78 in the objective lens housing 76 and the lens 72 in the lens housing 71 combine to focus the overall system at focal point F. Preferably focal point F is at the aperture 55 of the first iris diaphragm 54. Accordingly, the focus point F is located at a distance D from the output end 84 of the fiber optic conduit 30, or at the diaphragm aperture 55.

As the fiber optic conduit 30 is repeatedly manipulated during use, it is common to have a few of the fiber optic elements to break in between the light source and the headlamp assembly 26. If the focusing lens arrangement 50 were focused upon the output end 32 of the fiber optic conduit 30, the projected circle of light emitted from the headlamp assembly 26 would contain dark spots that correspond to the location to the broken elements in the fiber optic conduit 30. Furthermore, if the output end 32 of the fiber optic conduit 30 were the point of focus, the projected circle of light may have a honeycomb appearance that corresponds to the dark edges of each fiber optic element that surrounds its bright center. The presence of the uneven honeycomb illumination in addition to the dark spots caused by broken fiber optic elements is very distracting to a surgeon and is therefore highly undesirable.

In the shown embodiment, the various focusing lenses 72, 77, are focused upon the aperture 55 of the first iris diaphragm 54. The plane of focus is therefore a predetermined distance D in front of the output end 84 of the fiber optic conduit 30. At this point, the light emitted from the fiber optic conduit 30 is sufficiently mixed so that the light has a substantially even brightness across the entire plane of focus despite any individual broken fiber optic elements that may be present. The mixed light, therefore, eliminates any dark spots or honeycomb separations from the beam of light projected from the headlamp assembly 26.

As light emanates from the output end 84 of the fiber optic conduit 30 within the cable connector 68, the light is concentrically directed along the optical path 70 of the headlamp assembly. The first iris diaphragm 54 is positioned proximate the output end 84 of the fiber optic conduit 30. If the central aperture 55 of the first diaphragm 54 is opened to a diameter that is larger than the diameter of the beam of light exiting the fiber optic conduit 30, then the first iris diaphragm 54 has substantially no effect on the beam of light. However, if the first iris diaphragm 54 is adjusted so that the diameter D1 of its central aperture 55 is less than that of the beam of light, then the diaphragm 54 partially obstructs the beam of light, thereby reducing the diameter of the beam.

The second iris diaphragm 56 is located a predetermined distance in front of the first iris diaphragm 54, where the distance is dependent upon the optical path of the beam of light as determined by the length of the headlamp assembly 26 and the optical power of the various focusing lenses 72, 77. If the diameter D2 of the central aperture 57 of the second iris diaphragm 56 is set to be smaller than the diameter D1 of the central aperture 55 of the first iris diaphragm 54 then the second iris diaphragm 56 obstructs part of the light passing through the first iris diaphragm 54 for the purposes to be later described. Light passing through the central aperture 57 of the second iris diaphragm 56 impinges upon the various focusing lenses 72, 77. The light is then magnified, collimated or otherwise adjusted depending upon the optical elements used in focusing the light.

Figure 5A:
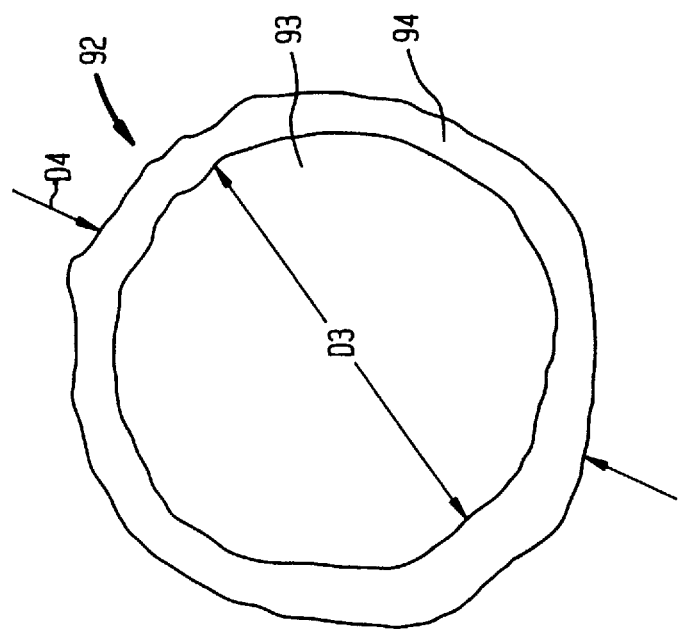
FIG. 5a shows a projected light pattern made by the present invention headlamp device, wherein only the first optical diaphragm used to limit the beam of light creating the pattern.

In FIG. 5a there is shown a projected light pattern 92 made by the present invention headlamp assembly. The projected light pattern 92 has a central region 93 of a diameter D3, wherein the light is of a generally uniform intensity. A interference region 94, having a diameter D4, surrounds the periphery of the central region 93, creating a penumbra. The interference region 94 is less intense than central region 93, wherein the interference region 94 is caused by the various interference patterns in the projected light. Referring to FIG. 3 in conjunction with FIG. 5a, it will be understood that the projected light pattern 92 of FIG. 5a can be created when neither the first iris diaphragm 54 nor the second iris diaphragm 56 interferes with the beam of light within the headlamp assembly 26. However, by manipulating the size of the central aperture 55 of the first iris diaphragm 54, the overall size of the projected light pattern 92, in FIG. 5a, can be controlled. That is, by reducing the diameter D1 of the central aperture 55 (FIG. 3), the diameter D4 of the interference region 94 and the diameter D3 of the central region 93 can be correspondingly reduced. As a result, the presence of the first iris diaphragm 56 enables a surgeon to selectively control the size of the projected light pattern 92 from a pinpoint opening to a maximum size that corresponds to the widest open condition of the first iris diaphragm 54.

Figure 5B:
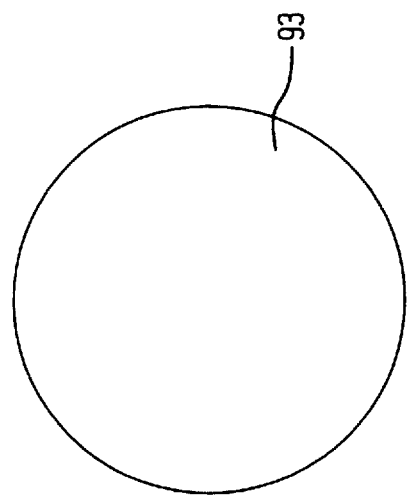
FIG. 5b shows a projected light pattern made by the present invention headlamp device, wherein both the first and second optical diaphragms are used to limit the beam of light creating the pattern.
Figure 1:
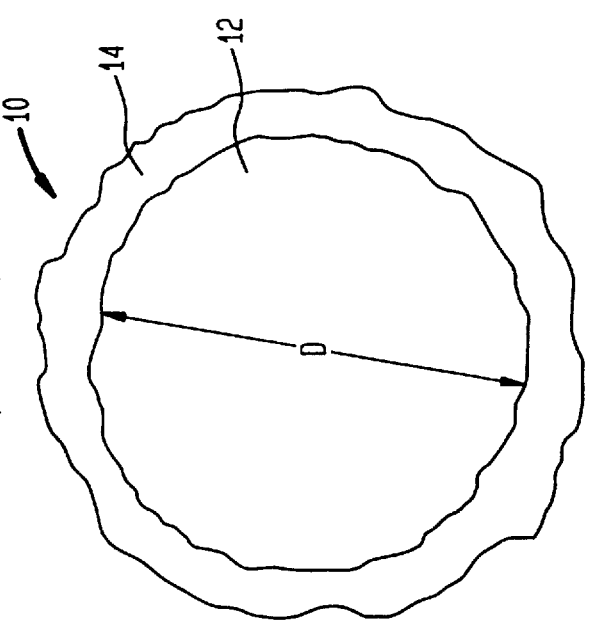
FIG. 1 shows a projected light pattern from a typical prior art surgical headlamp device.

Although the first iris diaphragm 54 can be used to adjust the size of the projected light pattern 92, the projected light pattern 92 still includes a central region 93 and an interference region 94. The central region 93 has a diameter D3, while the interference region 94 has the larger diameter D4. The part of the light beam creating the interference region 94 can be selectively obscured by adjusting the central aperture 57 of the second iris diaphragm 56 (FIG. 4) so that only light corresponding to the central region 92 of the light pattern 92 passes therethrough. Referring to FIG. 5b in conjunction with FIG. 3, it can be seen that when the second iris diaphragm 56 is properly adjusted, the interference region is eliminated and only the clear, evenly illuminated central region 93 is projected. Since the size of the light beam is adjustable by the manipulation of the first iris diaphragm 54, the second iris diaphragm 56 is also adjustable so that only the interference region of the projected light pattern can be obscured regardless to the diameter of the interference region.

In the shown embodiment, both the first iris diaphragm 54 and the second iris diaphragm 56 are selectively controlled by the rotational manipulation of the knurled adjustment collar 32. It will therefore be understood that in this embodiment the first iris diaphragm 54 cannot be adjusted independently. Rather, the manipulation of the knurled adjustment collar 32 simultaneously adjusts both the first iris diaphragm 54 and the second iris diaphragm 56. Since both the first iris diaphragm 54 and the second iris diaphragm 55 are adjusted simultaneously, it should be understood that their exists a predetermined size relationship between the size of the aperture 55 of the first iris diaphragm 56 and the size of the aperture 57 of the second iris diaphragm 56. The size relationship is proportioned so that the second iris diaphragm 56 will always obscure the penumbral region of the projected beam of light no matter how large or small the diameter of that projected beam of light is adjusted to be.

The use of a single adjustment collar 32 to simultaneously adjust both the first iris diaphragm 54 and the second iris diaphragm 56 is merely exemplary. Accordingly, it will be understood that separate controls can be used to adjust the first iris diaphragm 54 and the second iris diaphragm 56, thereby allowing for the independent adjustment of each.

Figure 6:
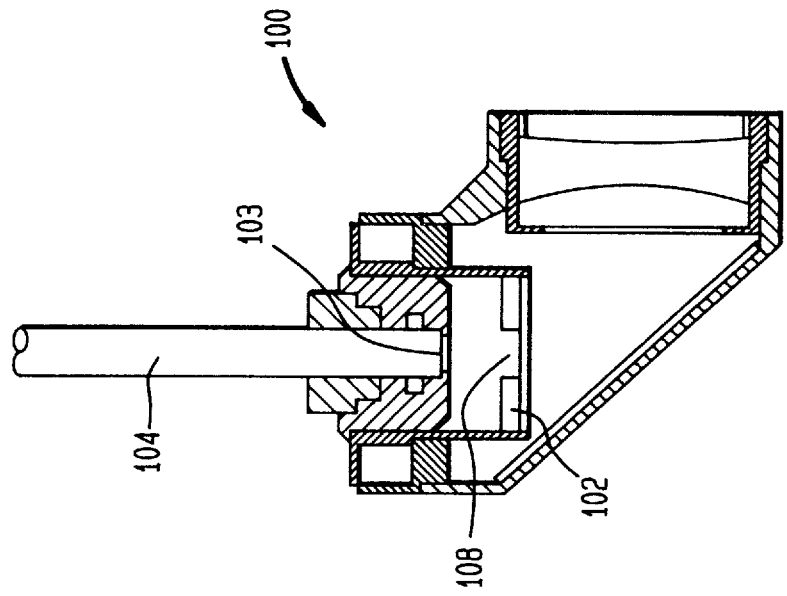
FIG. 6 shows an alternate embodiment of the present invention headlamp device having only a single optical diaphragm.

Referring to FIG. 6, there is shown a alternate embodiment of a headlamp assembly 100. In this embodiment there is only one fixed optical diaphragm 102 disposed between the output end 103 of the fiber optic conduit 104 and the focusing lenses. In this embodiment, the optical diaphragm 102 is positioned a predetermined distance from the output end 103 of the fiber optic conduit 104. The predetermined distance from the output end 103 of the fiber optic conduit 104 can be any length that extends beyond the point where the interference pattern in the beam of light emanating from the fiber optic conduit 104 is fully formed. The diameters of the clear central region and the interference region of the light beam are now at a predetermined distance from the output end 103 of the fiber optic conduit 104. The central aperture 108 of the optical diaphragm 102 is sized to obstruct the interference region at this point, yet enable the clear central region to pass unobstructed. As a result, the projected light pattern viewed by a surgeon is devoid of the interference region.

The set position of the diaphragm 102 and the constant size of its central aperture 108 provide a projected light pattern that can not be varied in size, but provides a clearly projected light pattern that does not contain an undesirable interference region.

However, it will be understood that the projected light pattern could be varied in size of an adjustable optical diaphragm were used, provided the diaphragm did not open wide enough to permit passage of the interference region of the projected light beam.

It will be understood that the present invention surgical assemble described in conjunction with the various drawings are merely exemplary and a person skilled in the art of optical assemblies may make numerous variations and modifications to the shown embodiments utilizing functionally equivalent compounds to those described. More specifically, it will be understood that any type of adjustable or fixed apertures can be used in place of the optical diaphragms described. Similarly any combination of lenses may be used in the focusing lens arrangement so as to provide a magnifying, reducing or collimating effect on the projected light beam. All such variations and modifications are intended to be included within the scope of the invention as defined by the appended claims.

What is claimed is:

1. A headlamp apparatus, comprising:

a housing;

a fiber optic conduit terminating at an output surface in said housing, wherein said fiber optic conduit transmits a beam of light, generated from a remote light source, along an optical path within said housing, said beam of light of a given diameter having a central region of a predetermined brightness and a peripheral region that is less bright than said predetermined brightness;

a first adjustable optical diaphragm disposed proximate said output surface on said optical path, said first adjustable optical diaphragm selectively controlling the diameter of said beam of light passing therethrough;

a second adjustable optical diaphragm disposed on said optical path, said second adjustable optical diaphragm selectively obscuring said peripheral region of said beam of light, thereby enabling only light contained in said central region to pass therethrough; and means for simultaneously adjusting said first and second adjustable optical diaphragms in order to simultaneously control both the size and eliminate said peripheral region of said beam of light.

2. The apparatus according to claim 1, wherein a focusing lens arrangement is focused at an output of said first adjustable optical diaphragm.

3. The apparatus according to claim 2, wherein said focusing lens arrangement is focused at a point between said adjustable optical diaphragm and said second adjustable optical diaphragm.

4. The apparatus according to claim 1, further including a means for supporting said headlamp apparatus on the head of a person.

5. The apparatus of claim 1, wherein said simultaneous adjustment means includes an iris housing for supporting both said adjustable diaphragms, an adjustment collar and a collet housing, wherein both said adjustment collar and collet housing enclose said iris housing.

6. A method of projecting a beam of light from a fiber optic source, comprising the steps of positioning said fiber optic source so that said beam of light is emitted from said fiber optic source along a predetermined optical path, wherein said beam of light has a central region surrounded by a penumbral region;

controlling the size of said beam of light by passing said beam of light through a first optical diaphragm having an adjustable aperture; and obstructing said penumbral region of said beam of light of a given size by passing said beam of light through a second optical diaphragm sized to permit only said central region of said beam of light therethrough, wherein said controlling the size and obstructing said penumbral region of said beam of light is performed simultaneously.

7. The method according to claim 6 wherein interference occurs in said beam of light along said optical path, wherein said interference creates said penumbral region, at a distinct point along said path and said method further includes the step of positioning said second optical diaphragm along said optical path at a position beyond said distinct point where said penumbral region is found.

8. In an optical system where light is projected from a fiber optic conduit onto a target region, wherein the projected light of a given diameter contains a uniform central region and a surrounding uniform penumbral region, a method of eliminating the penumbral region comprising the steps of:

passing the projected light transmitted from said fiber optic conduit directly into a first adjustable optical diaphragm to selectively control the diameter of the projected light impinging upon said target region;

passing the projected light through a second adjustable optical diaphragm having an aperture sized to obstruct at least the penumbral region of the projected light, thereby enabling only light from the uniform central region to impinge upon said target region;

means for simultaneously adjusting said first and second adjustable optical diaphragms in order to simultaneously control both the diameter and eliminate the penumbral region of the projected light; and focusing the projected light onto said target region by passing the projected light through a focusing lens arrangement after the projected light has passed through said second optical diaphragm.

* * * * *